United States Patent
Chun et al.

Patent Number: 5,715,004
Date of Patent: Feb. 3, 1998

[54] TRANSFORMATION CODING APPARATUS

[75] Inventors: Kang-wook Chun, Seoul; Byeungwoo Jeon, Sungnam, both of Rep. of Korea

[73] Assignee: Samsung Electronics Co., Ltd., Kyungki-do, Rep. of Korea

[21] Appl. No.: 757,871

[22] Filed: Nov. 27, 1996

[30] Foreign Application Priority Data

Nov. 29, 1995 [KR] Rep. of Korea ............ 95-44958
Oct. 28, 1996 [KR] Rep. of Korea ............ 96-49253

[51] Int. Cl.$^6$ ............................................. H04N 7/50
[52] U.S. Cl. ................. 348/403; 348/404; 348/411; 382/199; 382/234
[58] Field of Search ......................... 348/400, 403, 348/404, 411, 420; 382/199, 234; H04N 7/50

[56] References Cited

U.S. PATENT DOCUMENTS 5,650,782  7/1997  Kim ............................. 348/411

*Primary Examiner*—Howard W. Britton
*Attorney, Agent, or Firm*—Sughrue, Mion, Zinn, Macpeak & Seas, PLLC

[57] ABSTRACT

A transformation coding apparatus for transforming blocks of data corresponding to a boundary of an object. The apparatus includes a transformer for transforming an input block and producing transformation coefficients, a transformation coefficient selector for selecting and outputting certain transformation coefficients based on the transformation coefficients and the input block, an inverse transformer for inversely transforming the transformation coefficients selected by the transformation coefficient select means, and outputting a restored block, and an encoder for variable-length-coding the select coefficients selected by the transformation coefficient select means. A repetition controller calculates a mean square error of the input data block and the restored data block, compares, the calculated mean square error with a predetermined reference value, and determines whether to continue selecting coefficients. The transformation coding apparatus selects the coefficients which maximize the ratio of the mean square error $\Delta MSE(k)$, to thereby enhance the quality of the picture and reduce the amount of necessary data bits.

14 Claims, 5 Drawing Sheets

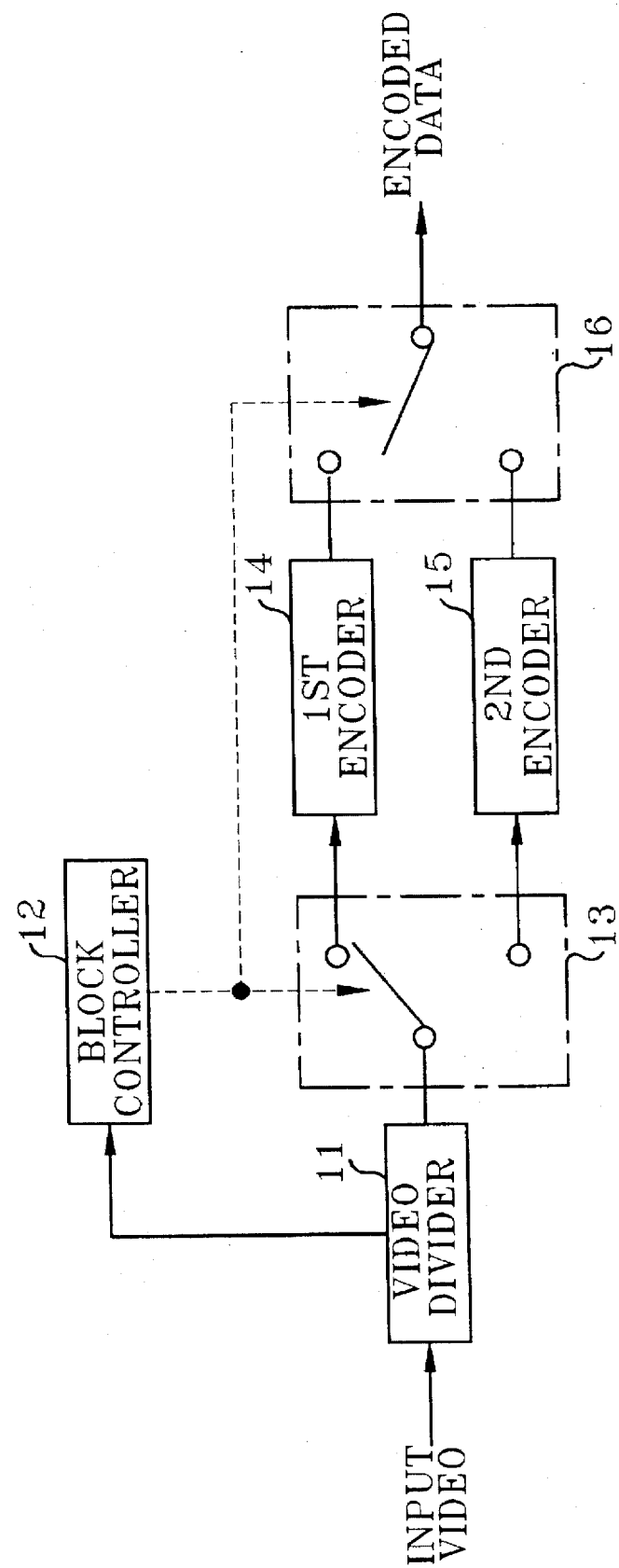

TRANSFORMATION CODING APPARATUS

BACKGROUND OF THE INVENTION

The present invention relates to a transformation coding apparatus for transforming an input video signal, including a signal which is representative of a boundary of an object. More particularly, the invention is directed to a transformation coding apparatus for transforming a block of data representative of an object and a boundary portion of that object, by selecting a transformation coefficient based on the quality of restoring a picture of an area including the boundary of the object.

Generally, transformation coding of a video signal is performed to reduce or compress the amount of data by eliminating redundancy. In such transformation coding operations, a picture frame is divided into blocks, each having a data size of N×N. The transformation coding is performed on each block, to thereby convert the video signal from the spatial domain to the frequency domain. According to this type of transformation coding, the energy of a signal (i.e., the value of the transformation coefficient) is chiefly concentrated in a lower frequency band. Typically, the transformation coding as described above, utilizes a discrete cosine transformation algorithm. In addition, transformation coding may be used for further compressing data by quantizing the transformation coefficients and variable-length-coding the quantized data.

The transformation coding technology performs transformation coding with respect to an N×N-sized rectangular block. However, it is inefficient to perform general transformation coding on a data block corresponding to a boundary of an object of a certain shape. Thus, when a boundary of an object is included in a particular block of data, different transformation coding methods for separately transforming the object and the other background area has been proposed.

Referring to FIG. 1, there is shown a block diagram of a general encoding apparatus for encoding an input video signal. The encoding apparatus includes a video divider 11, which divides the input video signal into blocks of data each having a data size of N×N. The N×N data blocks are applied to a block controller 12 and a first switch 13. The block controller 12 determines whether each input data block includes a boundary of an object, and controls the first switch 13 according to the result of that determination. More specifically, the first switch 13 directs the N×N-sized data blocks from the video divider 11 to a first encoder 14 or a second encoder 15 under the control of the block controller 12, the operation of which is described in more detail below. If the input block does not include a portion of an object's boundary, the block controller 12 controls the first switch 13 to direct the input data block to the first encoder 14. On the other hand, if the input block is representative of an object's boundary, the block controller 12 controls the first switch 13 to direct the input block to the second encoder 15. The first encoder 14 encodes the video signal blocks according to a general transformation coding method. The second encoder 15 performs transformation coding for the blocks representative of a boundary of an object having a certain shape, as will be described below.

The general encoding apparatus further includes a second switch 16, which is selectively connected to the outputs of the first and second encoders 14 and 15. The second switch 16 also operates under the control of the block controller 12. More specifically, if the input data block does not correspond to a boundary of an object, as determined by the block controller 12, the block controller 12 controls the second switch 16 to select the output of the first encoder Otherwise, if the input block corresponds to a boundary of an object as determined by the block controller 12, the block controller 12 controls the second switch 16 to select the output of the second encoder 15. Thus, the second switch 16 outputs the transformation coded data with respect to each of the input data blocks.

FIG. 2A is a detailed block diagram of the second encoder 15 and FIG. 2B is an illustration explaining an area requiring transformation coding by the second encoder of FIG. 2A.

As described above, the second encoder 15 performs transformation coding for each data block corresponding to a boundary of an object. Referring to FIG. 2A, a transformer 21 performs a discrete-cosine-transformation (hereinafter abbreviated as DCT-transforms) on data blocks (Bi), each having a data size of N×N, which are received via the video divider 11 and switch 13. Each of the data blocks (Bi) correspond to a boundary of an object having a certain shape. The transformer 21 produces N×N transformation coefficients F1 which are supplied to a coefficient selector 22. The coefficient selector 22 selects M particular coefficients from the input N×N transformation coefficients F1 and sets the other transformation coefficients to zero. The coefficients Fs selected by the coefficient selector 22 are input to an inverse transformer 23. The inverse transformer 23 inversely transforms the coefficients Fs to restore the data block, which is called a restored data block Br.

The restored data block Br is then input to a repetition controller 25, which calculates a mean square error of the input block Bi and the restored Br, and compares the mean square error with a predetermined reference value. The repetition controller 25 calculates the mean square error only with respect to the area which includes the boundary of an object. For example, as shown in FIG. 2B, the area including the boundary of the object is designated by the character "S". Therefore, the mean square error is calculated only with respect to the pixels within the "S" area. If the mean square error calculated by the repetition controller 25 is greater than a predetermined reference value, the repetition controller 25 replaces the pixel data of the area "S" (which includes the boundary of an object) in the restored block Br by pixel data in the corresponding area of the input block Bi, to form a reconstructed block Br', which is input to the transformer 21. The transformer 21 DCT-transforms the reconstructed blocks (Br') to produce N×N transformation coefficients, and outputs them to the coefficient selector 22. The coefficient selector 22 selects M particular coefficients. The coefficients selected by the coefficient selector 22 are inversely transformed by the inverse transformer 23 to produce a restored block Br. The repetition controller 25 calculates a mean square error of the input block Bi and the restored Br. The above steps are repeated until the mean square error is less than a predetermined reference value. When the mean square error is less than a predetermined reference value, the coefficients selected by the coefficient selector 22 are output to an encoder 24, which encodes the selected coefficients and outputs the encoded data.

In the general apparatus as described above, the coefficient selector 22 selects M coefficients in sequence of a larger value of energy among the N×N transformation coefficients, which minimizes the error in the entire area of the N×N-sized block. However, since a substantial portion of the N×N-sized block represents an area including the boundary of an object, the transformation coefficient selection method is inefficient.

SUMMARY OF THE INVENTION

To solve the above and other problems, it is an object of the present invention to provide a transformation coding apparatus for transforming a data block corresponding to a boundary of an object. The transformation is performed by selecting coefficients based on the quality of the restored picture with respect to the area including the boundary of an object, as opposed to the quality of the restored picture with respect to all of the data blocks.

To accomplish the above and other objects of the present invention, there is provided a transformation coding apparatus for transforming a block corresponding to a boundary of an object. The transformation coding apparatus includes transformer means for transforming an input block and outputting transformation coefficients, transformation coefficient select means for selecting and outputting transformation coefficients using the transformation coefficients and the input block, inverse transformer means for inversely transforming the transformation coefficients selected by the transformation coefficient select means and outputting a restored block, encoding means for variable-length-coding the coefficients selected by the transformation coefficient select means, and a repetition controller for calculating a mean square error of the input block and the restored block, comparing the calculated mean square error with a predetermined reference value, and determining whether to continue coefficient selection.

BRIEF DESCRIPTION OF THE DRAWINGS

Preferred embodiments of the present invention are described with reference to the drawings wherein:

FIG. 1 illustrates a block diagram of a general encoding apparatus for encoding an input video signal.

DETAILED DESCRIPTION OF THE PREFERRED EMBODIMENT

A preferred embodiment of the present invention will be described below in more detail with reference to the accompanying drawings.

Figure 2A:
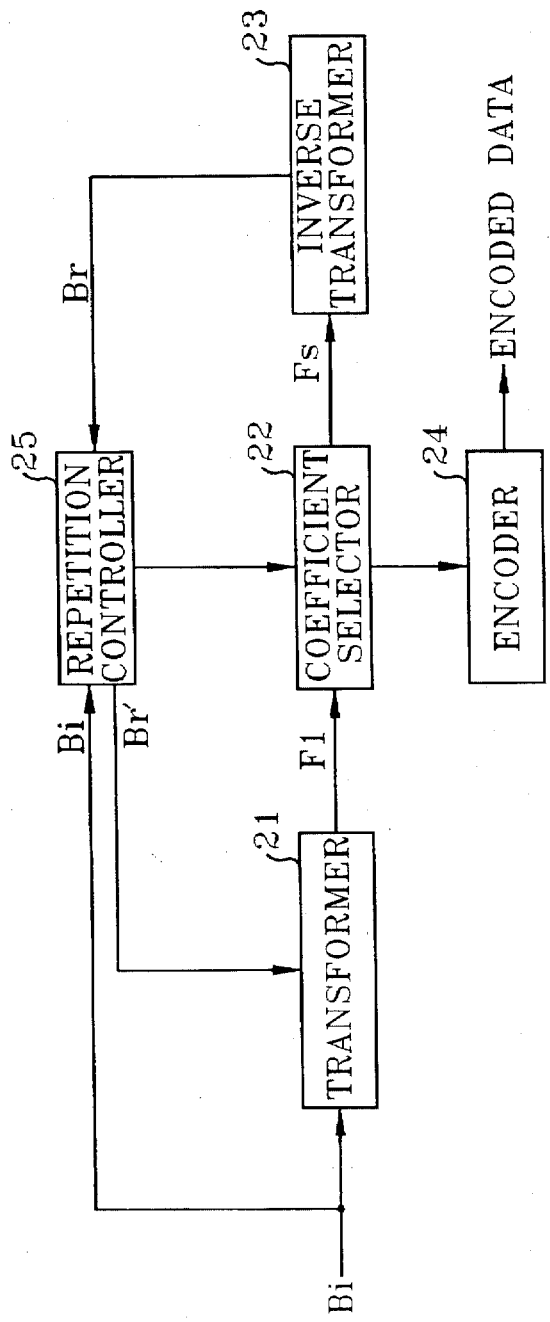
FIG. 2A illustrates a block diagram of a conventional second encoder of the general encoding apparatus of FIG. 1.
Figure 2B:
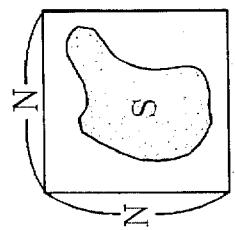
FIG. 2B is an illustration explaining an area requiring transformation coefficient selection in the second encoder of FIG. 2A.
Figure 3:
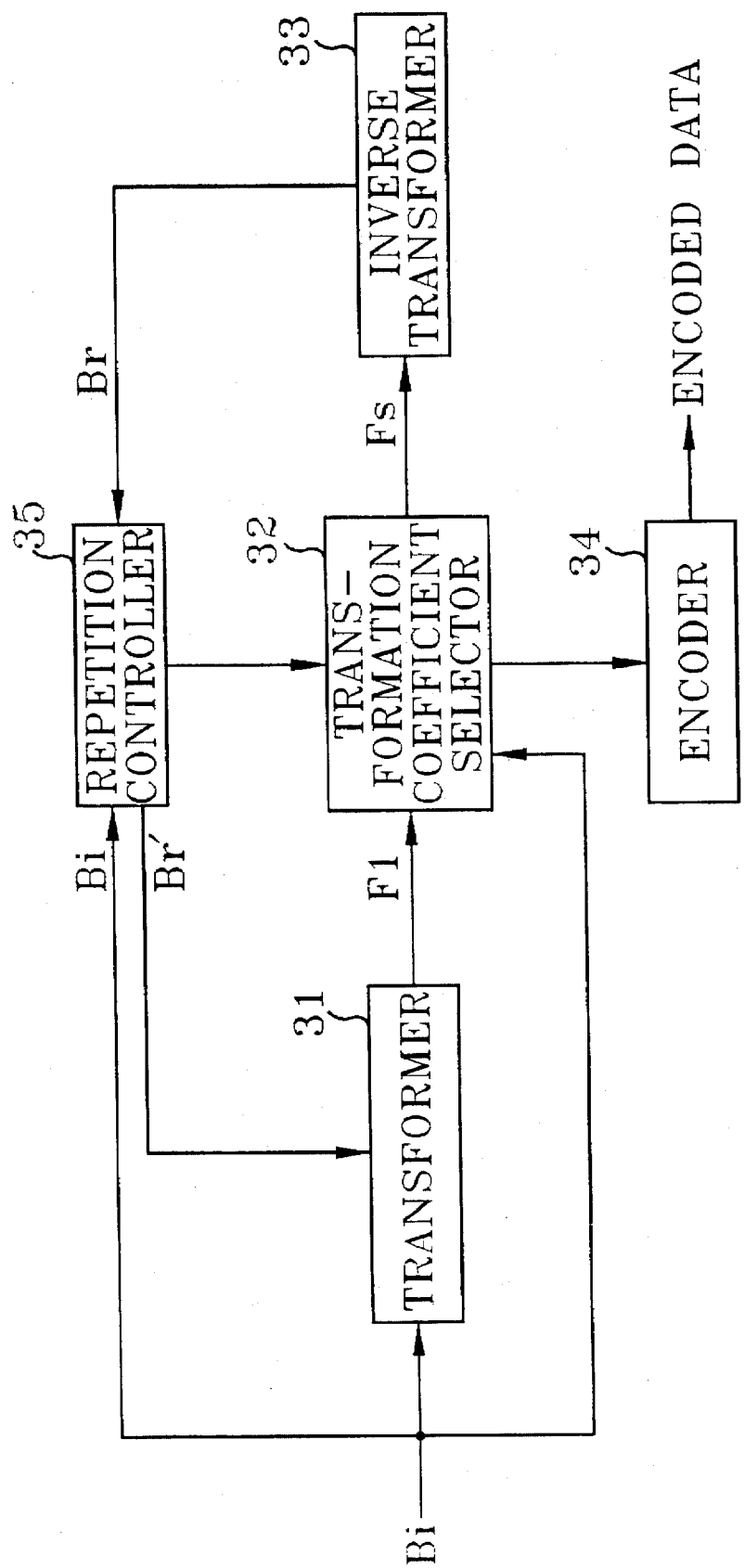
FIG. 3 shows a block diagram of a transformation coding apparatus according to a preferred embodiment of the present invention.

Referring to FIG. 3, there is shown a transformation coding apparatus for transforming a block of data representative of an object having a certain shape and a portion of the boundary of that object. The transformation coding apparatus includes a transformer 31 for DCT-transforming an N×N-size data block Bi and outputting N×N transformation coefficients F1. A transformation coefficient selector 32 selects and outputs transformation coefficients using the transformation coefficients F1 and the data block Bi. An inverse transformer 33 inversely transforms the selected transformation coefficients Fs and outputs a restored data block to a repetition controller 35. An encoder 34 functions to perform variable-length-coding on the selected coefficients Fs. The repetition controller 35 calculates a mean square error of the input data block Bi and the restored data block Br, comparing the calculated result with a predetermined reference value, and outputting a control signal for completing the selection of coefficients in the transformation coefficient selector 32, if the calculated mean square error is less than the predetermined reference value.

Figure 4:
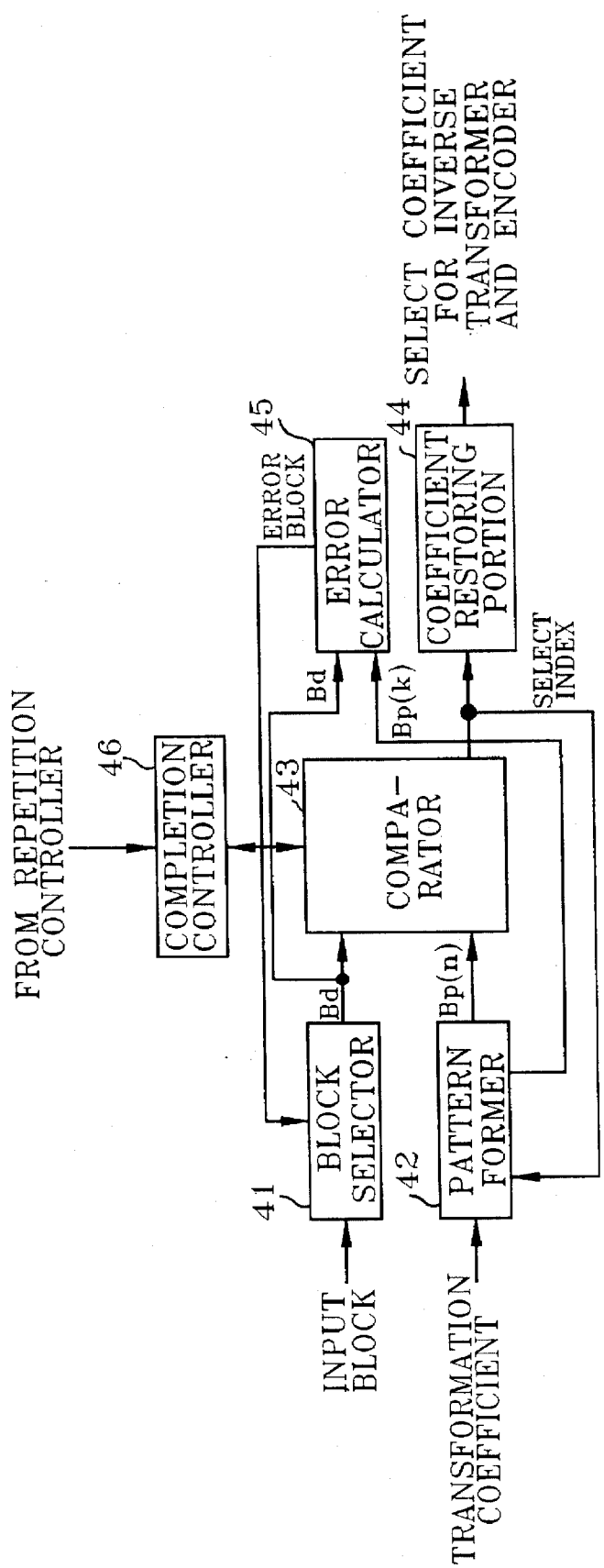
FIG. 4 is a detailed block diagram of the transformation coefficient selector of FIG. 3.

FIG. 4 illustrates a detailed block diagram of the transformation coefficient selector 32. The transformation coefficient selector 32 includes a block selector 41 for receiving the data block Bi, selecting the data block Bi or the error block, and outputting the selected block Bd. A pattern former 42 receives transformation coefficients of the data block Bi from the transformer 31, and forms and outputs pattern blocks Bp(n) with respect to the individual transformation coefficients. The pattern former 42 stores the pattern blocks and outputs pattern blocks Bp(k) corresponding to a select index. A comparator 43 selects a pattern block from among the pattern blocks Bp(n) which best-matches the block Bd selected by the block selector 41, and outputs the select index. A coefficient restoring portion 44 restores the transformation coefficient corresponding to the select index selected by the comparator 43. An error calculator 45 then calculates an error between the block Bd selected by the block selector 41 and the pattern block Bp(k) corresponding to the select index input from the pattern former 42, and produces an error block, which is output to the block selector 41. A completion controller 46 completes selection of the pattern block in the comparator 43 according to the control signal generated by the repetition controller 35.

Figure 5:
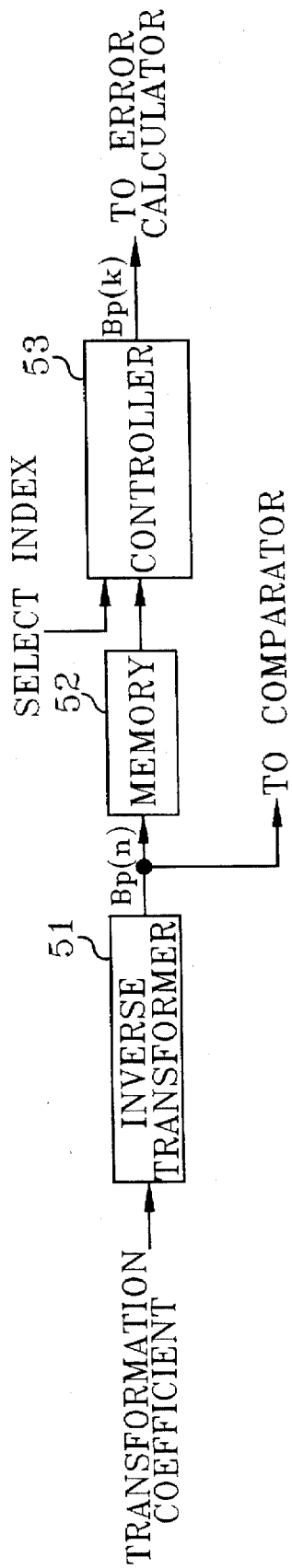
FIG. 5 is a detailed block diagram of the pattern former of FIG. 4.

Referring to FIG. 5, the pattern former 42 includes an inverse transformer 51 for performing an inverse transformation with respect to the input N×N transformation coefficients, forming N×N pattern blocks Bp(n), and outputting the pattern blocks Bp(n) to the comparator 43. A memory 52 is coupled to an output of the inverse transformer 51, and stores the pattern blocks Bp(n). A controller 53 outputs pattern blocks Bp(k) to the error calculator 45. The pattern blocks Bp(k) correspond to the select index, and are chosen from among all of the pattern blocks Bp(n) which are stored in the memory 52.

Figure 6:
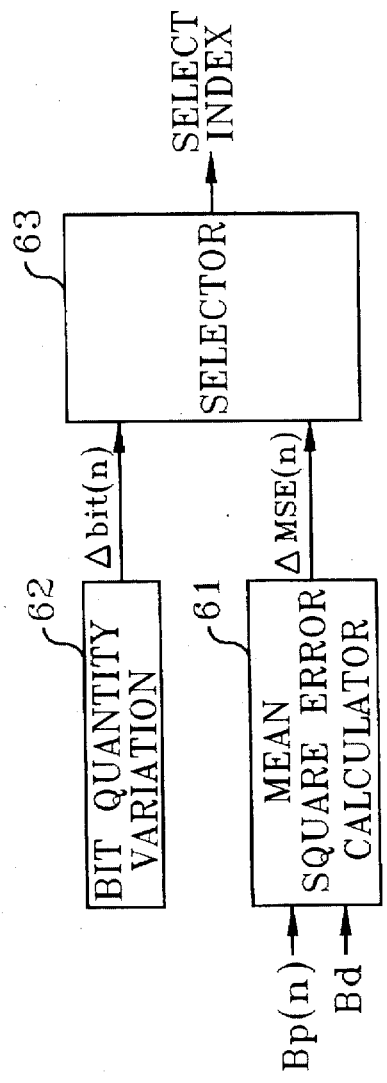
FIG. 6 is a detailed block diagram of the comparator of FIG. 4.

As shown in FIG. 6, the comparator 43 is composed of a mean square error calculator 61 for calculating a mean square error of the pattern block with respect to the respective coefficients of the block Bd and the N×N pattern blocks Bp(n), and a bit quantity variation calculator 62 for calculating the amount of variation of the bit quantity generated by additionally adding one coefficient to the bit quantity of the selected coefficients. The comparator also includes a selector 63 for selecting a pattern block of a coefficient which maximizes the ratio of the mean square error (calculated by the mean square error calculator 61) with respect to the amount of variation of the bit quantity, which is calculated by the bit quantity variation calculator 62 for the N×N pattern block.

The operation of the transformation apparatus for a block of data representing an object having a certain shape and a boundary portion of that object according to the present invention will now be described in detail.

The transformer 31 DCT-transforms the N×N-sized block Bi, which is received from the video divider 11, to produce the N×N transformation coefficients F1. The transformation coefficients F1 are input to the transformation coefficient selector 32. The transformation coefficient selector 22, in response to the input N×N transformation coefficients and the input block Bi, selects and outputs transformation coefficients Fs from among the N×N transformation coefficients.

The procedure for selecting a predetermined number of the transformation coefficients in the transformation coefficient selector 32 will be described with reference to the detailed block diagram of the transformation coefficient selector 32 shown in FIG. 4.

The block selector 41 selects and outputs an input block Bi received from the video divider 11 in the process of selecting a first transformation coefficient. The selector 41 then selects and outputs an error block between the pattern block Bp(k) (with respect to the transformation coefficient which has been selected in the previous process) and the input block Bi.

The pattern former 42 forms, outputs and stores pattern blocks Bp(n) with respect to the individual N×N transformation coefficients received from the transformer 31. In addition, if the select index k is input, the pattern blocks Bp(k) corresponding to the input select index k are output. The operation of the pattern former 42 will be described with reference to the detailed block diagram of the pattern former shown in FIG. 5.

Referring to FIG. 5, the inverse transformer 51 performs inverse transformation with respect to each of the input N×N transformation coefficients received from the transformer 31, and forms the N×N pattern blocks Bp(n). The pattern blocks Bp(n) are output to the comparator 43 and are also stored in the memory 52 of the pattern former 42. The memory 52 stores the pattern blocks Bp(n) output from the inverse transformer 51. The controller 53 receives the select index k and outputs pattern blocks Bp(k), which correspond to the select index, to the error calculator 45.

The comparator 43 selects a pattern block which best-matches the block Bd selected by the block selector 41 from among the pattern blocks Bp(n) received from the pattern former 42, and outputs the corresponding select index k.

The selection operation of the pattern block in the comparator 43 will be described with reference to the detailed block diagram of the comparator 31 shown in FIG. 6. The mean square error calculator 61 calculates a mean square error of the pattern block Bd received from the block selector 41 and the pattern blocks Bp(n) received from the pattern former with respect to all the pattern blocks which have not been selected until then, and outputs the result as $\Delta MSE(n)$ with respect to each pattern block. The bit quantity variation calculator 62 calculates and stores the bit quantity of the coefficients which have been selected until then, and calculates the amount of variation of the bit quantity generated according to any additional coefficient to output the calculated result as $\Delta bit(n)$. The selector 63 receives the mean square error $\Delta MSE(n)$ and the amount of variation of the bit quantity $\Delta bit(n)$, and selects a pattern block of a coefficient which maximizes a ratio $\Delta MSE(n)/\Delta bit(n)$ of the mean square error with respect to the amount of variation of the bit quantity, to thereby output the index k as a select index. That is, the selector 63 outputs the select index k which maximizes the ratio of the mean square error $\Delta MSE(k)$, which is decreased according to the added k-th coefficient, with respect to the amount $\Delta bit(k)$ of variation of the bit quantity which is increased according to the added k-th coefficient among the N×N coefficients.

The coefficient restoring portion 44 receives the select index k selected by the comparator 43 and restores and outputs the transformation coefficient corresponding to the select index k. The output transformation coefficient is a select index output from the transformation coefficient selector 32.

The error calculator 45 calculates an error between the block Bd selected by the block selector 41 and the pattern block Bp(k) corresponding to the select index received from the pattern former 42, and produces an error block. The error block is then output to the block selector 41.

The completion controller 46 completes selection of the pattern block by the comparator 43 according to the control signal generated by the repetition controller 35. That is, the completion controller 46 completes the selection of the transformation coefficient by the transformation coefficient selector 32 if the mean square error between the restored block with respect to the selected transformation coefficients and the input block is less than the predetermined reference value.

Thus far, the operation of the transformation coefficient selector 32, which is an essential element of the transformation coding apparatus for a data block corresponding to a boundary of an object according to the present invention has been described. Referring back to FIG. 3, the inverse transformer 33 inversely transforms the transformation coefficients Fs selected by the transformation coefficient selector 32, and then produces the restored block Br. The encoder 34 variable-length-codes the transformation coefficients Fs selected by the transformation coefficient selector 32, and then outputs the encoded data. The repetition controller 35 calculates a mean square error between the transformation coefficient selector 32 and the restored block Br and then allows the transformation coefficient selector 32 to complete the selection of the transformation coefficient if the calculated mean square error is smaller than the reference value.

As described above, the transformation coding apparatus for a data block of an object having a certain shape and a boundary portion of the object, in accordance with the present invention, selects a coefficient which maximizes the ratio of the mean square error $\Delta MSE(k)$. The mean square error $\Delta MSE(k)$ is decreased according to the added select coefficient (k-th coefficient), with respect to the amount $\Delta MSE(k)$ of variation of the bit quantity, which is increased according to the added coefficient (k-th coefficient). As a result, the original quality of the picture is enhanced and the amount of data required for the picture is reduced.

While only certain embodiments of the invention have been specifically described herein, it will be apparent that numerous modifications may be made thereto without departing form the spirit and scope of the invention.

What is claimed is:

1. A transformation coding apparatus for transforming blocks of data from an input signal, the data block corresponding to a boundary of an object, said transformation coding apparatus comprising:

transformer means for transforming a data block and outputting a first set of transformation coefficients;

transformation coefficient select means for selecting and outputting a second set transformation coefficients in accordance with said first set of coefficients and said data block;

inverse transformer means for inversely transforming said second set of transformation coefficients selected by the transformation coefficient select means and outputting a restored data block;

encoding means for variable-length-coding said second set of coefficients selected by the transformation coefficient select means; and a repetition controller for calculating a mean square error based on said data block and said restored data block, comparing said mean square error with a predetermined reference value, and determining whether to continue selection of coefficients.

2. The transformation coding apparatus as defined by claim 1, wherein said transformation coefficient select means comprises:

a block selector for selecting one of said data block and an error block and outputting a selected block;

a pattern former for receiving said first set of transformation coefficients from said transformer means and forming and outputting pattern blocks with respect to individual transformation coefficients of said first set, said pattern form comprising means for storing said pattern blocks and outputting said pattern blocks corresponding to a select index;

a comparator for selecting a pattern block which best-matches said selected block from among said pattern blocks stored by said pattern former, and for outputting said select index;

a coefficient restorer for restoring the transformation coefficient corresponding to the select index generated by said comparator;

an error calculator for calculating an error between the block selected by said block selector and the pattern block corresponding to the select index received form said pattern former, and producing said error block, said error block being output to said block selector; and a completion controller for completing selection of the pattern block in the comparator according to a control signal received from the repetition controller.

3. The transformation coding apparatus as defined by claim 2, wherein said pattern former comprises:

an inverse transformer for performing inverse transformation with respect to said first set of transformation coefficients, forming said N×N pattern blocks, and outputting said pattern blocks to said comparator;

a memory for storing said pattern blocks; and a controller for outputting pattern blocks corresponding to said select index to the error calculator.

4. The transformation coding apparatus as defined by claim 3, wherein said comparator comprises:

a mean square error calculator for calculating a mean square error of said pattern block with respect to the coefficients of said selected block and said N×N pattern blocks received from said pattern former;

a bit quantity variation calculator for calculating the amount of variation of the bit quantity generated by additionally adding one coefficient to the bit quantity of the selected coefficients; and a selector for selecting a pattern block of a coefficient which maximizes the ratio of said mean square error calculated with respect to the amount of variation of the bit quantity calculated by said bit quantity variation calculator for the N×N pattern block.

5. The transformation coding apparatus as defined by claim 2, wherein said block selector selects and outputs a data block in the process of selecting a first transformation coefficient, and selects and outputs an error block between said pattern block with respect to the transformation coefficient which has been selected in a previous transformation process and said data block being processed for selection of transformation coefficients.

6. The transformation coding apparatus as defined by claim 2, wherein said selector selects a pattern block of a coefficient which maximizes the ratio of the mean square error calculated by said mean square error calculator with respect to the amount of variation of the bit quantity calculated by said bit quantity variation calculator to accordingly output said select index.

7. An apparatus for encoding a video signal, comprising:

a video divider for dividing said video signals into first and second sets of data blocks, each having a predetermined size, said first set of data blocks corresponding to an object, and second set of data blocks corresponding to a boundary portion of said object;

a first decoder for decoding said first set of said data blocks according to a first predetermined algorithm;

a second decoder for decoding said second set of said data blocks according to a second predetermined algorithm;

a first switch, coupled between said video divider and said first and second decoders, for selectively directing said first set of said data blocks to said first decoder and directing said second set of data blocks to said second decoder;

a second switch, coupled to outputs of said first and second decoders, for outputting encoded data, wherein said second decoder comprises a transformation coding apparatus for transforming said second set of data blocks, said transformation coding apparatus comprising:

transformer means for transforming each of said second set of data blocks and outputting a first set of transformation coefficients;

transformation coefficient select means for selecting and outputting a second set transformation coefficients in accordance with said first set of coefficients and said data block;

inverse transformer means for inversely transforming said second set of transformation coefficients selected by the transformation coefficient select means and outputting a restored data block;

encoding means for variable-length-coding said second set of coefficients selected by the transformation coefficient select means; and a repetition controller for calculating a mean square error based on said data block and said restored data block, comparing said mean square error with a predetermined reference value, and continuing selection of coefficients until said mean square error is minimized below said predetermined reference value.

8. The apparatus as defined by claim 7, further comprising a block controller for selectively controlling said first and second switches based on the content of data within each of said data blocks.

9. The apparatus as defined by claim 7, wherein said transformation coefficient select means comprises:

a block selector for selecting one of said data block and an error block and outputting a selected block;

a pattern former for receiving said first set of transformation coefficients from said transformer means and forming and outputting pattern blocks with respect to individual transformation coefficients of said first set, said pattern form comprising means for storing said pattern blocks and outputting said pattern blocks corresponding to a select index;

a comparator for selecting a pattern block which best-matches said selected block from among said pattern blocks stored by said pattern former, and for outputting said select index;

a coefficient restorer for restoring the transformation coefficient corresponding to the select index generated by said comparator;

an error calculator for calculating an error between the block selected by said block selector and the pattern block corresponding to the select index received form said pattern former, and producing said error block, said error block being output to said block selector; and a completion controller for completing selection of the pattern block in the comparator according to a control signal received from the repetition controller.

10. The apparatus as defined by claim 9, wherein said pattern former comprises:

an inverse transformer for performing inverse transformation with respect to said first set of transformation coefficients, forming said N×N pattern blocks, and outputting said pattern blocks to said comparator;

a memory for storing said pattern blocks; and a controller for outputting pattern blocks corresponding to said select index to the error calculator.

11. The transformation coding apparatus as defined by claim 10, wherein said comparator comprises:

a mean square error calculator for calculating a mean square error of said pattern block with respect to the coefficients of said selected block and said N×N pattern blocks received from said pattern former;

a bit quantity variation calculator for calculating the amount of variation of the bit quantity generated by additionally adding one coefficient to the bit quantity of the selected coefficients; and a selector for selecting a pattern block of a coefficient which maximizes the ratio of said mean square error calculated with respect to the amount of variation of the bit quantity calculated by said bit quantity variation calculator for the N×N pattern block.

12. The transformation coding apparatus as defined by claim 9, wherein said block selector selects and outputs a data block in the process of selecting a first transformation coefficient, and selects and outputs an error block between said pattern block with respect to the transformation coefficient which has been selected in a previous transformation process and said data block being processed for selection of transformation coefficients.

13. The transformation coding apparatus as defined by claim 9, wherein said selector selects a pattern block of a coefficient which maximizes the ratio of the mean square error calculated by said mean square error calculator with respect to the amount of variation of the bit quantity calculated by said bit quantity variation calculator to accordingly output said select index.

14. A method of encoding a video signal, comprising the steps of:

dividing said video signals into first and second sets of data blocks, each having a predetermined size, said first set of data blocks corresponding to an object, and second set of data blocks corresponding to a boundary portion of said object;

decoding said first set of said data blocks according to a first predetermined algorithm;

decoding said second set of said data blocks according to a second predetermined algorithm;

selectively combining encoded data output by said first and second predetermined algorithms, wherein said second predetermined algorithm comprises the steps of:

transforming each of said second set of data blocks and outputting a first set of transformation coefficients;

selecting and outputting a second set transformation coefficients in accordance with said first set of coefficients and said data block;

inversely transforming said second set of transformation coefficients and outputting a restored data block;

variable-length-coding said second set of coefficients; and calculating a mean square error based on said data block and said restored data block, comparing said mean square error with a predetermined reference value, and continuing selection of coefficients until said mean square error is minimized below said predetermined reference value.

* * * * *